(12) United States Patent
Gastaldi

(10) Patent No.: US 7,338,120 B2
(45) Date of Patent: Mar. 4, 2008

(54) DEVICE FOR ATTACHING A CHILD SAFETY SEAT TO A FIXED CATCH ON A VEHICLE

(75) Inventor: Roberto Gastaldi, Turin (IT)

(73) Assignee: SABELT S.p.A., Turin (IT)

( * ) Notice: Subject to any disclaimer, the term of this patent is extended or adjusted under 35 U.S.C. 154(b) by 99 days.

(21) Appl. No.: 11/432,988

(22) Filed: May 12, 2006

(65) Prior Publication Data
US 2007/0262636 A1    Nov. 15, 2007

(51) Int. Cl.
*A47D 1/10* (2006.01)
(52) U.S. Cl. ............... 297/253; 297/254; 297/463.1
(58) Field of Classification Search ........... 297/254, 297/253, 250.1, 463.1, 463.2
See application file for complete search history.

(56) References Cited
U.S. PATENT DOCUMENTS

| | | | | |
|---|---|---|---|---|
| 5,487,588 A | * | 1/1996 | Burleigh et al. | 297/253 |
| 6,082,819 A | * | 7/2000 | Jackson | 297/253 |
| 6,209,957 B1 | * | 4/2001 | Baloga et al. | 297/253 |
| 6,260,920 B1 | * | 7/2001 | Tolfsen | 297/256.16 |
| 6,375,260 B1 | * | 4/2002 | Hiramatsu et al. | 297/256.16 |
| 6,513,873 B2 | * | 2/2003 | Tsuda et al. | 297/253 |
| 6,764,135 B2 | * | 7/2004 | Sasaki et al. | 297/256.16 |
| 6,796,610 B2 | * | 9/2004 | Nakagawa et al. | 297/256.16 |
| 7,159,948 B1 | * | 1/2007 | Wolf | 297/463.1 |

* cited by examiner

*Primary Examiner*—David Dunn
*Assistant Examiner*—Erika Garrett
(74) *Attorney, Agent, or Firm*—Blakely, Sokoloff, Taylor & Zafman; Stephen M. De Klerk

(57) ABSTRACT

A device for attaching a child safety seat has a frame defining a slot engageable by a fixed catch; and a lever which rotates, about an axis of rotation, from a release position to a lock position to retain the catch inside the slot. The frame guides a control member, in a direction perpendicular to the axis of rotation of the lever, between a forward position and a withdrawn position with respect to the slot; a spring pushes the control member into the withdrawn position, and a cam transmission rotates the lever into the release position as the control member is pushed into the forward position in opposition to the spring; and the lever is fixed radially with respect to its axis of rotation, and is retained in the release position by a pin, carried by the control member, engaging a seat on the frame.

13 Claims, 3 Drawing Sheets

DEVICE FOR ATTACHING A CHILD SAFETY SEAT TO A FIXED CATCH ON A VEHICLE

The present invention relates to a device for attaching a child safety seat to a fixed catch on a vehicle.

BACKGROUND OF THE INVENTION

For attachment to vehicle seats, some child safety seats comprise a latch device having a horizontal slot which is engaged by a standard catch pin, commonly referred to as an "isofix" catch, fitted to the vehicle seat.

The latch device comprises a lever which rotates about a horizontal axis from a raised release position to a lowered lock position to hold the catch pin inside the slot.

International Patent Application WO03010024 describes a latch device comprising a button which slides perpendicularly to the axis of rotation of the lever into a forward position with respect to the horizontal slot to rotate the lever into the release position.

To release the lever, motion is transmitted from the button by a lock pin fitted to the button itself and engaging a cam on the lever. When the button is in the withdrawn position with respect to the horizontal slot, the lock pin engages an end portion of the cam to hold the lever in the lock position.

In addition to rotating, the lever also slides parallel to the button, so as to disengage the lock pin and rotate into the release position when the latch device is connected to the fixed catch on the vehicle seat.

In the above solution, latching onto the fixed catch is fairly difficult, on account of the catch, when being inserted inside the slot, cooperating with and resting on the lever to produce the compound movement of the lever. In fact, the catch pushes the lever to slide it first towards the button, and then rotate it into the release position.

Moreover, on account of the lever having to slide towards the button, a fair amount of travel of the latch device is required to insert the catch inside the slot.

A need is therefore felt to simplify operation when connecting the latch device to the fixed catch on the vehicle seat.

Furthermore, the form of the various component parts should also preferably be simplified.

SUMMARY OF THE INVENTION

It is an object of the present invention to provide a device for attaching a child safety seat to a fixed catch on a vehicle, and designed to meet the aforementioned requirements in a straightforward, low-cost manner.

According to the present invention, there is provided a device for attaching a child safety seat to a fixed catch on a vehicle, the device comprising:
  a frame defining a slot engageable by said catch;
  a lever which rotates, about an axis of rotation and with respect to said frame, between a release position, in which it permits engagement/disengagement of said slot by said catch, and a lock position, in which it closes said slot to retain said catch;
  a control member;
  guide means carried by said frame to enable said control member to slide, in a direction perpendicular to said axis of rotation, between a forward position and a withdrawn position with respect to said slot;
  push means to push said control member into said withdrawn position; and
  cam transmission means, between said lever and said control member, to rotate said lever into the release position as said control member slides, in opposition to said push means, into said forward position;

wherein said lever is fixed radially with respect to said axis of rotation, and wherein the device comprises:
  retaining means carried by said frame to retain said lever in the release position; and
  release means for releasing said retaining means to permit rotation of said lever into said lock position.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
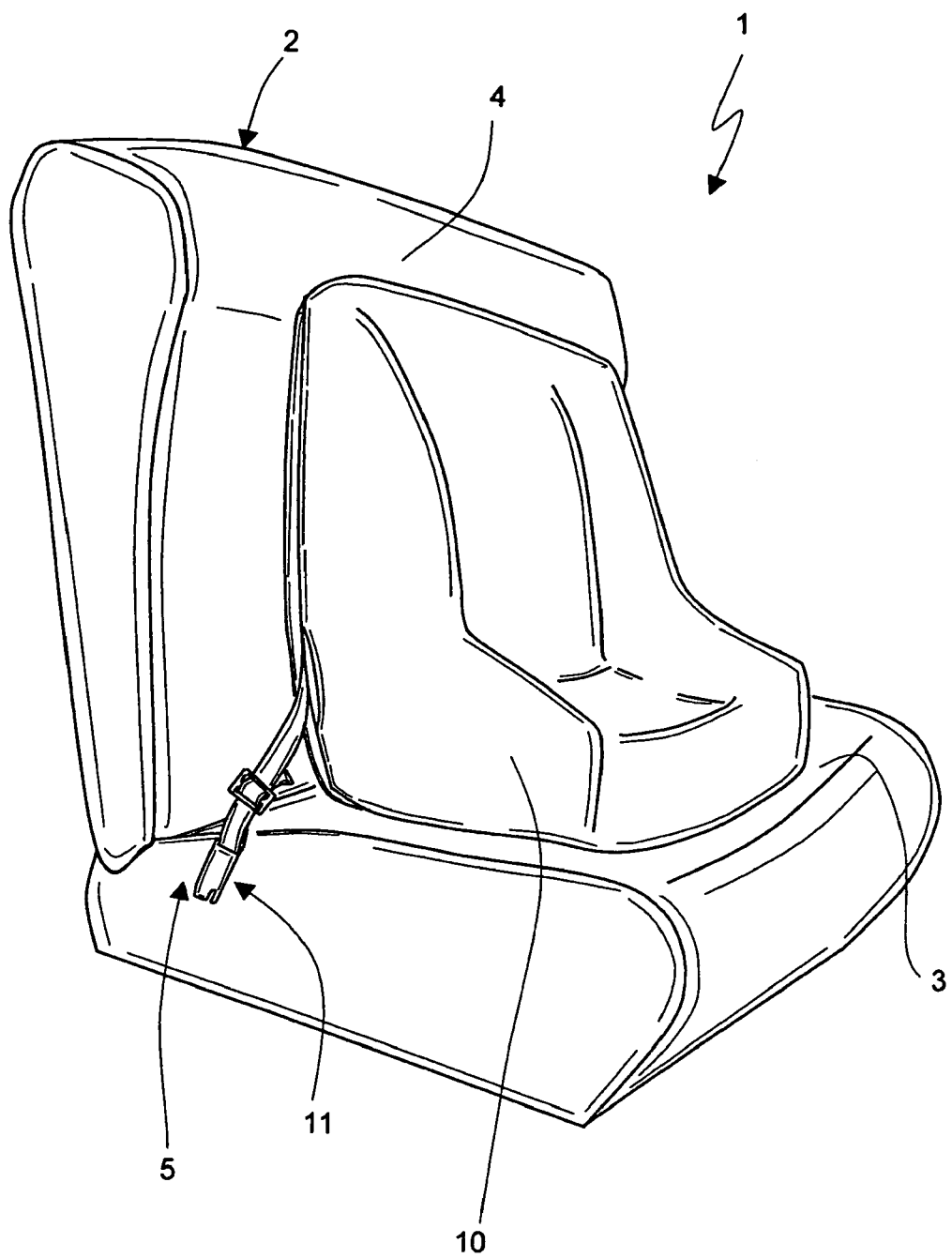
FIG. 1 shows a view in perspective of a child safety seat featuring a preferred embodiment of the device, according to the present invention, for attachment to a fixed catch on a vehicle.
Figure 2:
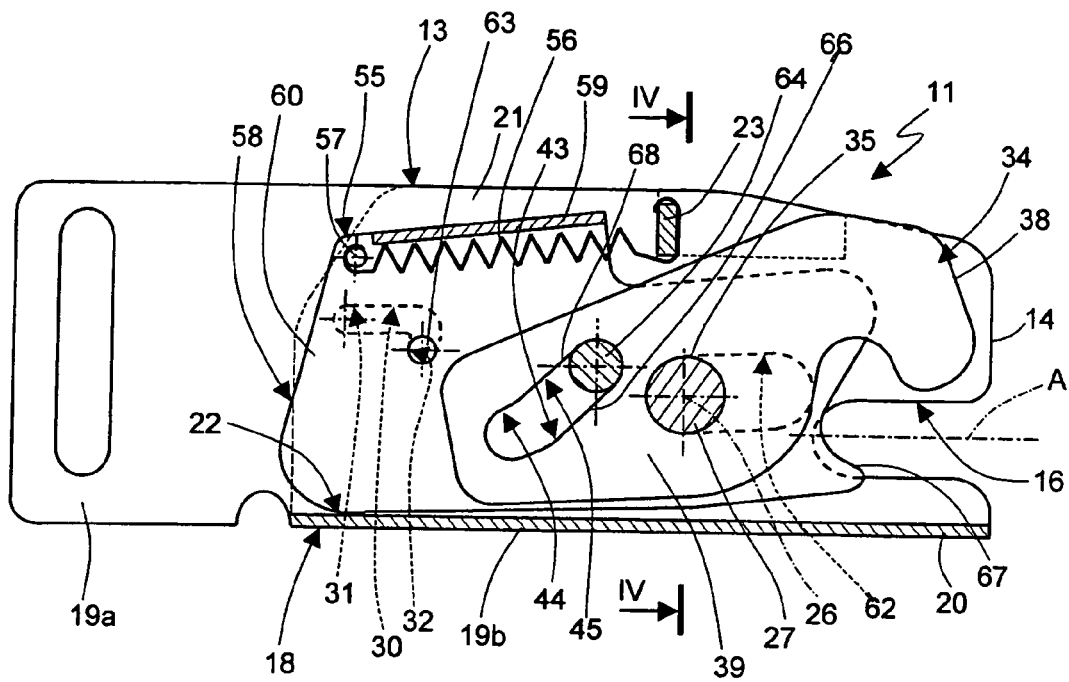
FIG. 2 shows a larger-scale section of the FIG. 1 device.

Number 1 in FIG. 1 indicates a child safety seat secured to a vehicle by a coupling system 5 so as to rest both on the seat portion 3 and against the seatback 4 of a vehicle seat 2.

Coupling system 5 comprises two horizontal catch pins 6 (one shown in section in FIG. 3) which are fitted in fixed positions to the vehicle frame (not shown), on opposite sides of seatback 4 and at the bend between seat portion 3 and seatback 4, and which define a standard anchor commonly referred to as an "isofix" anchor.

Safety seat 1 comprises a seat portion 10 resting onto the seat portion 3 and has a frame (not described in detail) carrying a strap, which is fitted on the ends with two latch devices 11 forming part of coupling system 5 and each of which latches releasably onto a respective pin 6.

FIG. 1 shows one latch device 11, which is released from the respective pin 6 (not visible). Being identical and symmetrical, only one of devices 11 is described herein, and the terms "front", "rear", "lateral", "vertical", "down", "up", "top", "bottom", etc, used in connection with the various component parts, refer to their as-used position on the vehicle.

With reference to FIGS. 2 to 5, device 11 comprises a frame 13, in turn comprising a fork-shaped rear end 14 defining a slot 16, which is engaged/disengaged by pin 6 by relative movement in a direction A perpendicular to pin 6 and substantially parallel to the longitudinal axis of the vehicle.

Frame 13 comprises a plastic casing (not shown); and a metal support 18, which in turn comprises an end fastening portion 19a connected to the frame of the safety seat 1 by means of the above mentioned strap, and a portion 19b housed inside the plastic casing and having a U-shaped cross section.

More specifically, portion 19b defines a longitudinal seat 22, and comprises a bottom wall 20 and two lateral walls 21.

One of walls 21 defines an extension of portion 19a, and integrally supports a transverse shoulder 23 housed in seat 22.

Walls 21 support, in a fixed relative position, a hinge and guide pin 27 having a horizontal axis 26 perpendicular to the engagement direction A of slot 16 and pin 6.

Walls 21 define respective closed, substantially L-shaped grooves or slots 30, each comprising a straight front portion 31 defining a guide parallel to direction A, and a rear portion 32 extending downwards from the end of portion 31.

Figure 4:
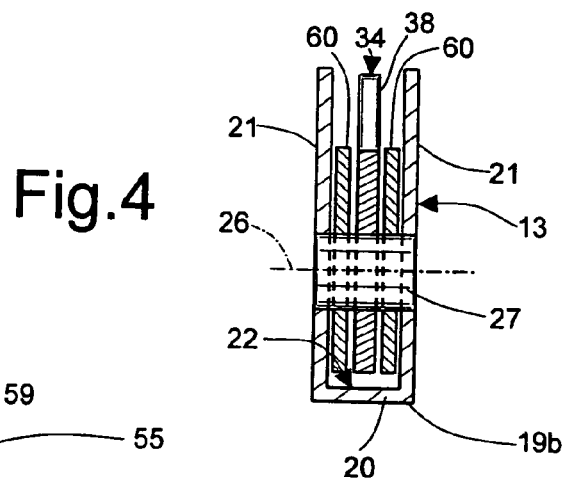
FIG. 4 shows a section along line IV-IV in FIG. 2.
Figure 6:
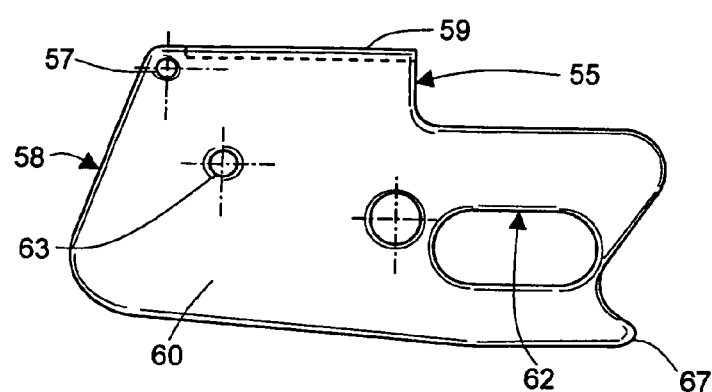
FIGS. 5, 6 and 7 show side views of respective parts of the FIGS. 2 and 3 device.
Figure 7:
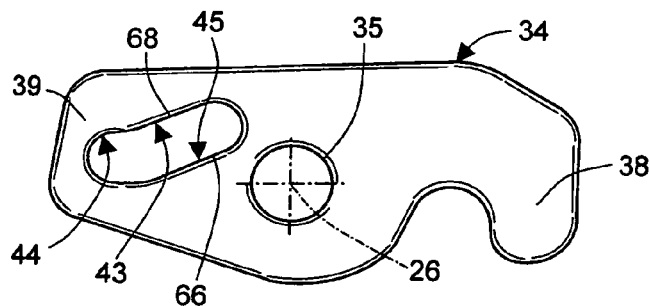
Figure 5:
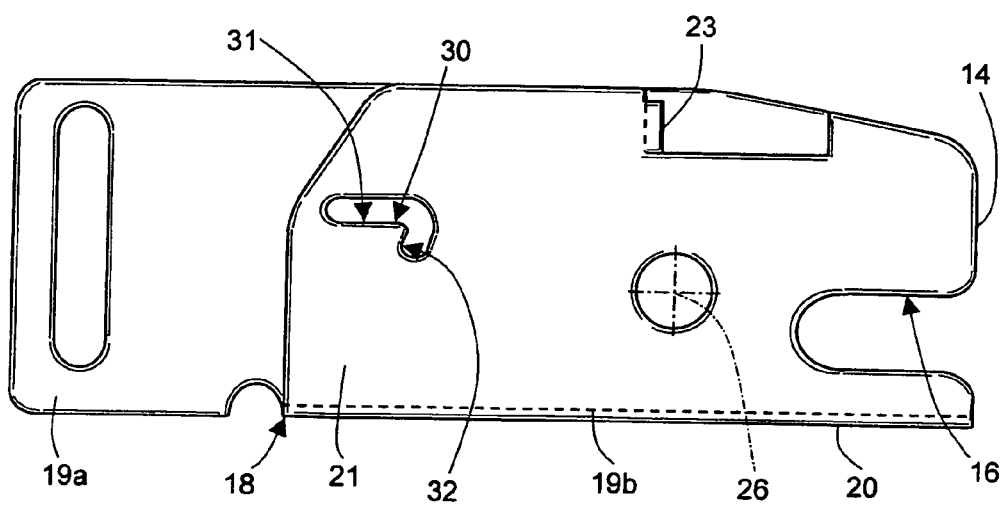

With reference to FIGS. 4 and 7, seat 22 houses a rocker arm lever 34, an intermediate portion 35 of which is hinged to pin 27 to rotate about axis 26. Lever 34 is fixed radially with respect to axis 26, is in the form of a plate, lies in a plane perpendicular to axis 26, and comprises two diametrically opposite arms 38, 39. Arm 38 is hook-shaped; arm 39 has a groove or slot 43; and slot 43 comprises a rear portion 45 defining a transmission cam, and terminates with a front portion 44 for retaining lever 34 in the lock position.

Lever 34 is rotated by a push control member 55 housed partly inside seat 22 and connected to frame 13 to slide, perpendicularly to axis 26, between a withdrawn position and a forward position with respect to slot 16.

Member 55 is normally pushed into the withdrawn, or front limit, position by a spring 56 interposed between shoulder 23 and a top portion 57 of member 55, and can be pushed into the forward, or rear limit, position by pressing manually on a surface 58 defining the front of member 55 and projecting frontwards from the casing of frame 13.

Member 55 has a U-shaped cross section, is positioned astride lever 34, and comprises a top wall 59 and two lateral walls 60. Walls 60 define respective straight slots or grooves 62 engaged in sliding manner by pin 27, which therefore guides member 55 between the forward and withdrawn positions. Walls 60 support, in fixed positions, respective pins 63, which are coaxial with each other and project outwards to each engage a respective slot 30 in sliding manner. Walls 60 also support, in a fixed position, a pin 64 which is parallel to pins 27 and 63, is located between pins 63 and slots 62, and engages slot 43 in sliding manner.

Figure 3:
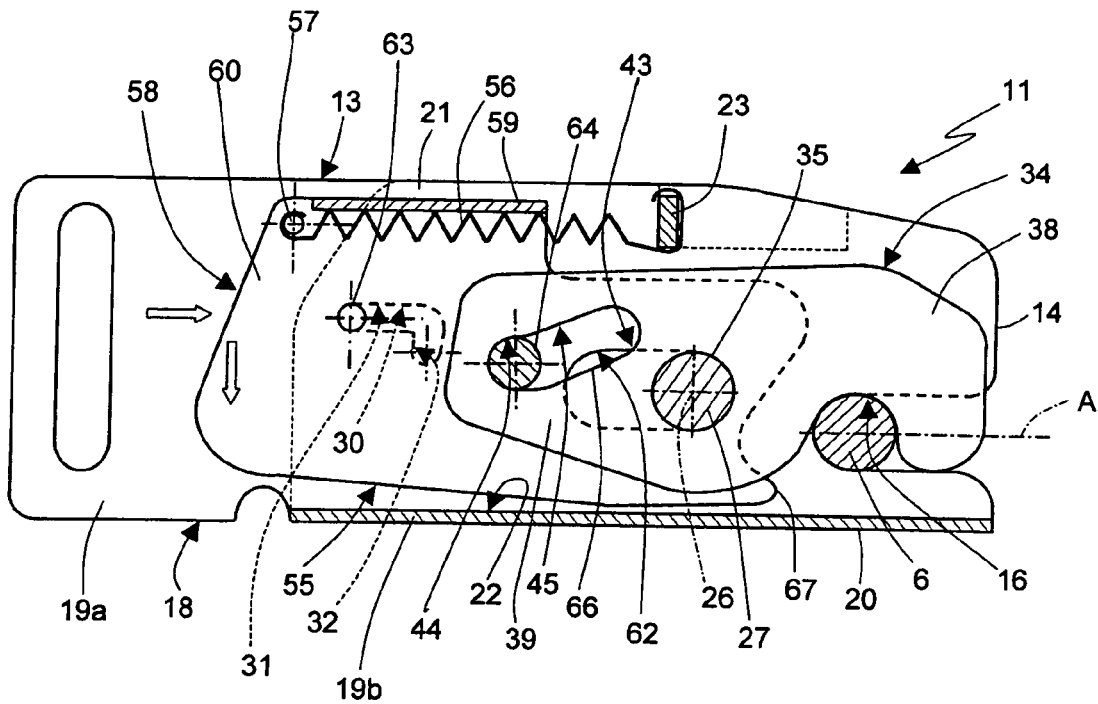
FIG. 3 shows the same view as in FIG. 2, of the FIG. 2 device in a different operating position.

More specifically, portion 45 of slot 43 has a bottom edge 66, which is pushed downwards by pin 64 to rotate lever 34 about axis 26 towards the release position, as member 55 moves forwards into the rear limit position in opposition to spring 56 and guided by pin 27 and portions 31 (FIG. 3).

When member 55 reaches the forward position, the whole defined by lever 34 and member 55 can be rotated about axis 26 by acting on surface 58 manually (anticlockwise in FIG. 2) to click pins 63 inside respective portions 32 of slots 30. As shown clearly in the drawings, during this rotation, lever 34 continues moving towards the release position.

Portions 32 are shaped to retain pins 63 and so retain lever 34 in the final release position. In this operating condition (FIG. 2), an end portion 67 of each wall 60 engages slot 16, and is so shaped as to be pushed downwards by pin 6 as pin 6 engages slot 16 in direction A; which downward thrust rotates the whole defined by lever 34 and member 55 (clockwise) about axis 26, thus releasing pins 63 from respective portions 32.

Once pins 63 are released, member 55, pushed by spring 56 and guided by pin 27 and portions 31, is free to withdraw into the front limit position.

Portion 45 has a top edge 68 which, as member 55 is withdrawn by spring 56 into the front limit position, is pushed upwards by pin 64 to rotate lever 34 into the lock position.

When lever 34 is in the lock position, pin 64 engages portion 44 of slot 43 (FIG. 3), so that, in the event of the vehicle crashing, rotation of lever 34 into the release position and, therefore, accidental release of pin 6 are prevented by the top edge of pin 64 resting against portion 44 in a tangential direction with respect to axis 26.

To release device 11 from pin 6, surface 58 is simply pressed, in opposition to spring 56, to disengage pin 64 from portion 44 and then rotate lever 34 into the release position.

Device 11 thus operates precisely as regards attachment to pin 6, on account of pin 6 not having to move lever 34 directly to engage and lock inside slot 16. In fact, lever 34 does not begin moving until pin 6 reaches the bottom of slot 16. What is more, on reaching the bottom of slot 16, pin 6 cooperates with and rests on member 55, as opposed to lever 34.

In fact, given the biunique relationship, produced by pin 64 sliding inside slot 43, between the positions of member 55 and lever 34, portions 32 releasably locking member 55 in the forward position also retain lever 34 in the release position.

Release of lever 34 from the release position is straightforward and automatic, by being effected directly by pin 6 as it engages slot 16.

Moreover, forming slots 30 and engagement of slots 30 by pins 63 are relatively straightforward.

The fact that pins 63 and pin 64 are separate makes it relatively easy to fit pins 63 inside slots 30 and pin 64 inside slot 43 when assembling device 11.

Device 11 is also extremely safe as regards accidental release of pin 6, on account of the top edge of pin 64 engaging the top edge of portion 44.

The closed contour of slot 43 enables the use of relatively straightforward component parts; and guiding member 55 by means of pin 27 further enhances the simplicity of device 11.

Moreover, spring 56 normally pushes lever 34 into the lock position, as opposed to the release position, so that operation of device 11 as a whole is safer and more accurate, and lever 34 is rotated automatically into the lock position once pins 63 are released from portions 32.

Clearly, changes may be made to device 11 as described and illustrated herein without, however, departing from the scope of the present invention as defined in the accompanying claims.

In particular, spring 56 may act on lever 34, as opposed to member 55; and/or the function of retaining lever 34 in the release position may be performed by frame 13 directly on lever 34 itself, as opposed to member 55; and/or connection of and motion transmission between lever 34 and member 55 may be defined by portions or cams formed differently from those described and illustrated; and/or slot 43 may have no portion 44, and the safety anti-release function may be performed otherwise than as shown.

The invention claimed is:

1. A device for attaching a child safety seat to a fixed catch on a vehicle, the device comprising:
a frame defining a first slot engageable by said catch;
a lever which rotates, about an axis of rotation and with respect to said frame, between a release position, in which it permits engagement/disengagement of said first slot by said catch, and a lock position, in which it closes said first slot to retain said catch;
a control member;
guide means carried by said frame to enable said control member to slide, in a direction perpendicular to said axis of rotation, between a forward position and a withdrawn position with respect to said first slot;

push means to push said control member into said withdrawn position; and cam transmission means, between said lever and said control member, to rotate said lever into the release position as said control member slides, in opposition to said push means, into said forward position;

wherein said lever is fixed radially with respect to said axis of rotation, and wherein the device comprises:

retaining means carried by said frame to retain said lever in the release position; and release means for releasing said retaining means to permit rotation of said lever into said lock position.

2. A device as claimed in claim 1, wherein said retaining means comprise a seat for retaining a portion, carried by said control member, in opposition to said push means when the control member is in the forward position.

3. A device as claimed in claim 2, wherein said guide means comprise at least one substantially L-shaped second slot comprising a straight portion extending in the slide direction of said control member; said seat defining an end portion of said second slot.

4. A device as claimed in claim 3, wherein said control member supports a first pin guided by said guide means; and wherein said cam transmission means comprise a cam, and a second pin engaging said cam in sliding manner and separate from said first pin.

5. A device as claimed in claim 4, wherein said second pin is also supported by said control member and is parallel to said first pin.

6. A device as claimed in claim 4, wherein said cam is defined by a closed third slot.

7. A device as claimed in claim 6, wherein said third slot comprises a retaining end portion; rotation of said lever into said release position being prevented by said second pin resting against said retaining end portion in a tangential direction with respect to said axis of rotation.

8. A device as claimed in claim 1, wherein said release means comprise a portion of said control member.

9. A device as claimed in claim 8, wherein said release means comprise an end portion of said control member; said end portion engaging said first slot when said control member is in the forward position, and being so designed as to be pushed by said catch as said catch engages said first slot.

10. A device as claimed in claim 1, wherein said retaining means form part of said guide means.

11. A device as claimed in claim 10, wherein said control member supports a first pin guided by said guide means; and wherein said cam transmission means comprise a cam, and a second pin engaging said cam in sliding manner and separate from said first pin.

12. A device as claimed in claim 1, wherein said push means comprise a spring interposed between said control member and a shoulder of said frame.

13. A device as claimed in claim 1, wherein said guide means comprise a pin hinging said lever to the frame.

* * * * *